Figure 1:
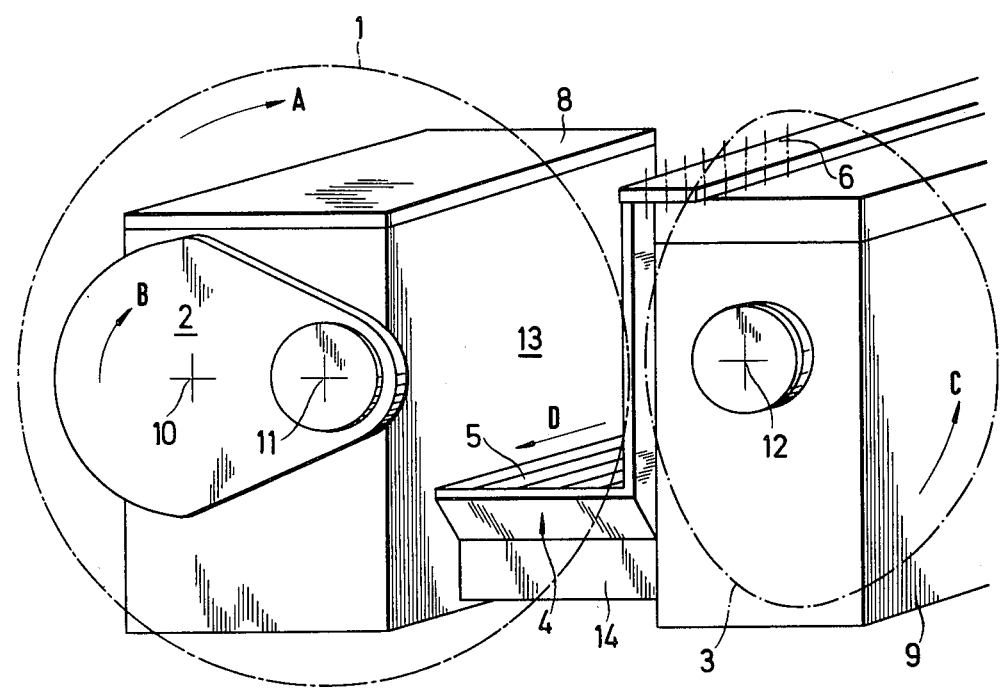

United States Patent [19]
Fessler et al.

[11] 3,884,105
[45] May 20, 1975

[54] HIGH-DUTY CHEESE-SLICING MACHINE

[75] Inventors: Andreas Fessler; Ewald Fessler, both of Heimenkirch, Allgau, Germany

[73] Assignee: Hochland, Reich, Summer & Co., Heimenkirch, Allgau, Germany

[22] Filed: Oct. 18, 1973

[21] Appl. No.: 407,671

[30] Foreign Application Priority Data
Oct. 20, 1972 Germany............................ 2251567

[52] U.S. Cl. ...................... 83/419; 83/490; 83/421; 83/163
[51] Int. Cl. .......................................... B23d 19/100
[58] Field of Search ............ 83/421, 490, 705, 703, 83/704, 419, 163

[56] References Cited
UNITED STATES PATENTS

| | | | |
|---|---|---|---|
| 1,419,418 | 6/1922 | Slayton | 83/421 X |
| 1,768,580 | 7/1930 | Dischert | 83/421 X |
| 3,176,455 | 4/1965 | Buchanan | 83/676 X |
| 3,530,915 | 9/1970 | Moriuchi | 83/490 X |

*Primary Examiner*—Willie G. Abercrombie
*Attorney, Agent, or Firm*—Fleit and Jacobson

[57] ABSTRACT

A shaft for driving a rotary circular cutter is rotatably mounted in an eccentric member, which rotates at a lower speed so that the circular cutter reciprocates in each cutting cycle transversely to the inclined direction in which the block of cheese to be cut is advanced. A stop disc is disposed on the side opposite to that where the circular cutter is mounted. The stop disc is also reciprocable transversely to the direction in which the cheese is advanced. and is driven to perform a motion which is complementary to the slicing motion of the cutter. The stop disc has a stop surface which in the direction in which the cheese is advanced is spaced behind the cutting plane of the cutter by a distance which equals the desired thickness of each slice.

6 Claims, 3 Drawing Figures

HIGH-DUTY CHEESE-SLICING MACHINE

This invention relates to a high-duty cheese-slicing machine in which a shaft for driving a rotary circular cutter is rotatably mounted in an eccentric member which rotates at a lower speed so that the circular cutter reciprocates in each cutting cycle transversely to the inclined direction in which the block of cheese to be sliced is advanced.

In the known cheese-slicing machines of this kind, the block of cheese to be cut is advanced on an intermittently driven conveyor belt and the thickness of each slice of cheese to be cut off is adjusted by the selection of the feed increment of the conveyor belt. The block of cheese is pierced at its trailing end with a spike and is thus retained on the conveyor belt; said trailing end portion of each block of cheese must be discarded because it has been pierced by the spike. Besides, the charging of the slicing machine with cheese is time-consuming because the spike must be retracted and must be re-inserted into the next following block of cheese. For this reason, the blocks of cheese cannot be charged continuously. The setting of the feed increments is very critical and must be performed with very high accuracy, particularly for high-speed operations. Nevertheless, a constant thickness of the slices of cheese cut by this machine cannot be ensured.

Another known cheese-slicing machine comprises a turntable which rotates in a horizontal plane and carries a block of cheese, which is advanced under gravity. The turntable has a crescent-shaped aperture. A crescent-shaped cutter rotates with the turntable and is disposed over said aperture and during its rotation cuts slices from the block of cheese in a thickness which depends on the distance of the cutter from the plane defined by the turntable. Because the turntable is subjected to the entire weight of the block of cheese, an extremely large wear results so that the machine cannot be operated at high speed. The stress on the cutter is very high because only a relatively small part of the entire revolution is utilized for the slicing operation. As a result, the cutter becomes dull after a relatively short time so that a large wear results and the machines must be shut down often for a replacement of the cutter.

It is an object of the invention so to design a cheese-slicing machine of the kind described first hereinbefore that the output of the machine is increased, that there is no need for an exact adjustment of the feed increments, and that the machine can be continuously charged with blocks of cheese whereas the wasting of cheese is minimized.

This object is accomplished according to the invention in that a stop disc is provided, which is disposed on the side opposite to that where the circular cutter is mounted, the stop disc is also reciprocable transversely to the direction in which the cheese is advanced and is driven to perform a motion which is complementary to the cutting motion of the cutter, and the stop disc has a stop surface which in the direction in which the cheese is advanced is spaced behind the cutting plane of the cutter by a distance which equals the desired thickness of each slice. The cheese-slicing machine according to the invention differs from the machine described first hereinbefore in that the thickness of each slice no longer depends on the feed increment but on the distance between the stop surface of the stop disc and the cutting plane of the cutter. When the cutter has been moved out of the path of travel of the block of cheese, the latter is advanced to engage the stop disc, which at this time protrudes into the path along which the block of cheese is advanced and faces the leading end thereof. Thereafter, the eccentric member advances the rotating circular cutter whereas the stop disc is retracted at the same time. When the cut has been completed, the slice of cheese which has been cut off can drop freely without obstruction by the stop disc. It is thus ensured that even during operation at very high speed the slices of cheese which have been cut off will also have the same thickness and no cheese will be wasted because it is no longer necessary to retain the block of cheese by a spike pierced into the same. This enables also a continuous charging of the machine with blocks of cheese without shutdowns.

Another feature of the invention resides in that the distance between the stop plane and the cutting plane is adjustable. The stop disc comprises preferably a revolving segment of a circle and has a circular peripheral portion and opposite to the same a slightly curved peripheral portion, which is considerably set back from the circular portion so that the block of cheese is engaged by the disc only when the circular peripheral portion faces the block of cheese. The stop disc rotates in synchronism with the eccentric disc which carries the circular cutter.

According to another feature of the invention the circular cutter and the stop disc are covered with polytetrafluoroethylene on their surfaces which face the material to be cut so that the friction is minimized and a movement of the block of cheese into the circular cutter, which necessarily has a concavely ground cutting edge, is prevented; such movement would result in a considerable abrasion when the cutter slides off the block of cheese.

The covering of polytetrafluorethylene on the circular cutter is dimensioned to be co-planar with the concavely ground cutting edge.

For advancing the block of cheese, it is desirable to provide in known manner an intermittently driven belt conveyor but the feed increments thereof exceed the selected thickness of each slice. It is thus ensured that the block of cheese is snugly engaged with the stop disc by each feeding step and that the conveyor belt continues to move under the material to be sliced. In this case the feed increment need not be selected with high accuracy.

The shaft for driving the stop disc may be longitudinally adjustable by means of a servomotor, which is controlled by a weighing device so as to ensure that each slice of cheese has a specified weight. This arrangement ensures an automatic control of the weight of each slice and of the weight of each package containing a uniform number of slices of cheese.

Figure 2:
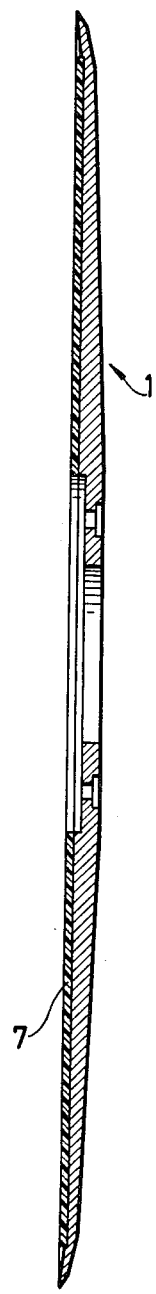
Figure 3:
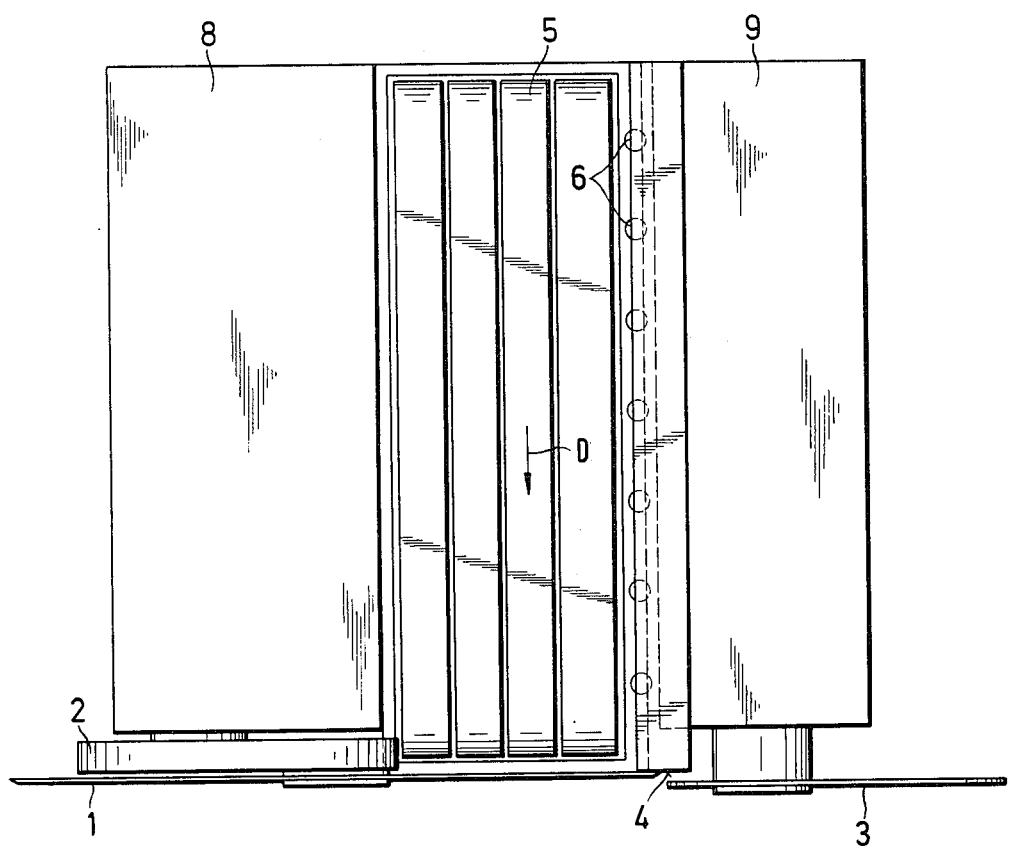

An embodiment of the invention is shown diagrammatically and by way of example on the accompanying drawing, in which FIG. 1 is a diagrammatic perspective view of the slicing machine according to the invention, FIG. 2 a sectional view showing the circular cutter of the machine according to the invention, and FIG. 3 a top plan view showing the machine of FIG. 1.

The cheese-slicing machine comprises two housing sections 8, 9, which define between them a passage 13 through which the cheese to be sliced is moved. Housing sections 8 and 9 are interconnected by the housing member 14. The housing section 8 is provided at its end face with a crank-shaped eccentric housing 2, which is driven on its shaft 10 in the direction of the arrow B. The circular cutter 1 is rotatably mounted in the eccentric housing on a shaft 11 and is driven in the direction of the arrow A. The eccentric housing 2 contains a gear train, which drives the shaft of the circular cutter at a speed which is much higher than the speed of the eccentric housing. With respect to the path along which the block of cheese to be cut is advanced, a stop disc 3 is disposed opposite to the circular cutter 1. On the side which is on the right on the drawing, this disc 3 has a circular peripheral portion whereas on the other side the periphery of the disc 3 is considerably set back and has only a slight curvature. The shaft 12 of the stop disc 3 is parallel to the shaft 11 of the circular cutter 1. The stop disc 3 is driven in the direction of the arrow C complementarily to the rotation of the eccentric housing 2.

An intermittently operable conveyor belt 5 for advancing the blocks of cheese is provided at the bottom of the passage 13.

The conveyor belt 5 and the drive shafts of the cutter 1, the eccentric housing 2 and the stop disc 3 have an inclination of about 45° to the horizontal. Besides, a roller bed 6 is provided on the inside of the housing section 9, which at its end face is provided with the rotatably mounted stop disc 3. Each block of cheese to be sliced bears on said roller bed as the block is advanced. To ensure a good engagement of the block of cheese with the roller bed, the machine is inclined also in the transverse direction by an angle of about 30°.

In FIG. 3, the circular cutter 1 and the stop disc 3 are indicated in a top plan view in dotted lines.

It is apparent from FIG. 2 that the circular cutter 1 having a concavely ground cutting edge is provided with an adhered sheet of polytetrafluoroethylene on that side which faces the material to be cut. This sheet is so thick that its contact surface is coplanar with the cutting edge. The stop disc 3 is also provided with a covering of polytetrafluoroethylene on that side which faces the material to be cut. The stop disc 3 rotates in synchronism with the eccentric housing 2 in such a phase relation thereto that there is always only a small gap between the edge of the cutter 1 and the edge of the stop disc 3. When the eccentric housing 2 has been rotated through 180° from its position shown on the drawing so that the circular cutter 1 has been fully retracted, the circular peripheral portion of the stop disc 3 has been introduced into the path of travel of the blocks of cheese; said portion is shown on the right on the drawing. In the direction of travel of the block of cheese i.e., the downstream direction, the stop surface of the stop disc is spaced behind the cutting plane of the circular cutter 1 by a distance which equals the desired thickness of each slice so that the thickness of each slice to be cut off is determined by the position of the stop disc, which is driven by a shaft, which is longitudinally adjustable by a known adjusting mechanism.

The feed conveyor belt 5 is driven in steps which are larger than the selected thickness of each disc so that the block of cheese is reliably forced against the stop disc.

The abovementioned device for longitudinally adjusting the shaft for driving the stop disc 3 may be operable by hand or by means of a servomotor which constitutes the final control element of a system for the automatic control of the weight of each slice of cheese. In this case the servomotor is operated by a weighing device, not shown, in such a manner that the distance between the stop disc 3 and the cutting plane of the circular cutter 1 is increased when the weight of the cut-off slices of cheese increases, and vice versa.

The slices which have been cut off are carried away by means of a delivery and stacking belt.

What is claimed is:

1. A cheese-slicing machine comprising first and second housing portions defining a gap therebetween, means for supporting a block of cheese and feeding it at an inclination to the horizontal through said gap, an eccentric rotatably mounted on said first housing portion, a circular slicing knife rotatably mounted on said eccentric in a cutting plane normal to the feeding direction of said block of cheese and adapted to be rotated at a faster speed than the rotary speed of said eccentric, said knife being reciprocated across said gap by the rotation of said eccentric so that said knife is alternately projected into and retracted from the feeding path of said block of cheese, and an abutment disc for said block of cheese mounted on said second housing portion opposite said knife and adapted to be reciprocated across said gap with a motion complementary to the reciprocating motion of said knife whereby the block of cheese abuts against an abutment face of said abutment disc when said blade is retracted, said abutment face of said abutment disc being spaced downstream of said cutting plane by a distance equal to the desired thickness of each cheese slice.

2. The machine of claim 1, and further comprising means for adjusting said spacing of said abutment face relative to said cutting plane.

3. The machine of claim 1, wherein said disc is rotatably mounted and comprises an arcuate first peripheral portion and a arcuate second peripheral portion of larger radius of curvature positioned opposite said first peripheral portion.

4. The machine of claim 1 and further including a coating of polytetrafluoroethylene on said abutment face and on the upstream face of said knife.

5. The machine of claim 1, wherein said feeding means comprise an intermittently driven conveyor belt adapted to be advanced in steps of a length greater than the said spacing of said abutment face downstream of said cutting plane.

6. The cheese slicing machine of claim 5 wherein said conveyor belt and said housing portions are inclined relative to the horizontal plane of said machine and in a traverse direction to said feeding path.

* * * * *